United States Patent [19]

Letellier

[11] 3,982,819
[45] Sept. 28, 1976

[54] FLUID GAP GLAN-LASER PRISM
[75] Inventor: Jules P. Letellier, Alexandria, Va.
[73] Assignee: The United States of America as represented by the Secretary of the Navy, Washington, D.C.
[22] Filed: May 22, 1975
[21] Appl. No.: 580,130

[52] U.S. Cl. ................................ 350/157; 350/286
[51] Int. Cl.² ........................ G02B 1/02; G02B 5/04
[58] Field of Search ........................... 350/157, 286; 331/94.5 C

[56] References Cited
UNITED STATES PATENTS
3,552,823  1/1971  Badoz et al. ...................... 350/157
3,914,018  10/1975  De Shazer ......................... 350/157

OTHER PUBLICATIONS
Mack, M. E. "Mode Locking the Ruby Laser," IEEE Journal of Quantum Electronics vol. QE-4, No. 12, Dec. 1968 pp. 1015–1016.

Capelle et al., "Tuned Nitrogen Laser Pumped Dye Laser," Applied Optics vol. 9, No. 12, Dec. 1970, pp. 2742–2745.

Primary Examiner—John K. Corbin
Assistant Examiner—Richard A. Rosenberger
Attorney, Agent, or Firm—R. S. Sciascia; Philip Schneider; Melvin L. Crane

[57] ABSTRACT

A Glan-laser prism polarizer in which spaced prisms are surrounded with an index of refraction matching fluid and the gap between the prisms is also filled with the fluid.

3 Claims, 2 Drawing Figures

FLUID GAP GLAN-LASER PRISM

BACKGROUND OF THE INVENTION

This invention relates to Glan-laser prisms used in laser systems and more particularly to a Glan-laser prism polarizer wherein the prism elements are surrounded by a fluid with an index of refraction matching fluid with the gap filled by the fluid.

Heretofore Glan-Thompson prisms have been used in laser systems. Glan-Thompson prisms are formed by two prisms cemented together at their interface. In use, these prisms were found not acceptable for use in high power lasers because the cement used could not withstand the high power. In order to solve the problem, the prisms were not cemented together and were positioned with an air gap in between the prisms. Such elements are known as a Glan-laser prism.

Crystals normally used for Glan-laser prisms are calcite. This material is a naturally occuring crystal having indexes of refraction of the birefringent crystal of 1.66 and 1.49. Calcite has a very high damage threshold, however, the cost of very high quality material are not readily available at any cost.

Since large Calcite prisms are not available, Glan-laser prisms have been constructed from 90% deuterated potassium dihydrogen phosphate (KD*P). KD*P has a small birefringence and is very hydroscopic; however, it has a damage threshold higher than quartz, it can be grown commercially in large strain free pieces, and it is very transparent at 1.06M, which is a desired operating wavelength. KD*P Glan-laser polarizers have been found to be good polarizers, but they suffer from low transmission and severe fringing of the output beam.

It has been determined that the between-prism gap (whose sides because of low birefringence are necessarily very parallel), acts like a shear-plate interferometer. Since the desired polarity compound of the light beam must operate very close to its critical angle, a substantial amount of the energy through the prism is in the unwanted first forward reflected beam. Since the gap is at an angle to the beam, and since the laser must operate with a diverging wavefront at useful levels, the result is unacceptable deep fringes on the transmitted beam.

SUMMARY OF THE INVENTION

This invention overcomes the problems with KD*P material prisms by submerging the KD*P prisms within an optical index of refraction matching fluid wherein the gap between the prisms is also filled with the fluid. By submerging the KD*P prisms and filling the gap with an index matching fluid, the reflection at the interface is reduced and allows the wedging of the gap so that the forward reflected beams will diverge from the path of the desired beam. Additionally, the index matching fluid operates to protect the KD*P prism from moisture and from rapid thermal fluctuations. A suitable fluid has been determined to be a fluorinated liquid made by the 3M company.

DETAILED DESCRIPTION

Figure 1:
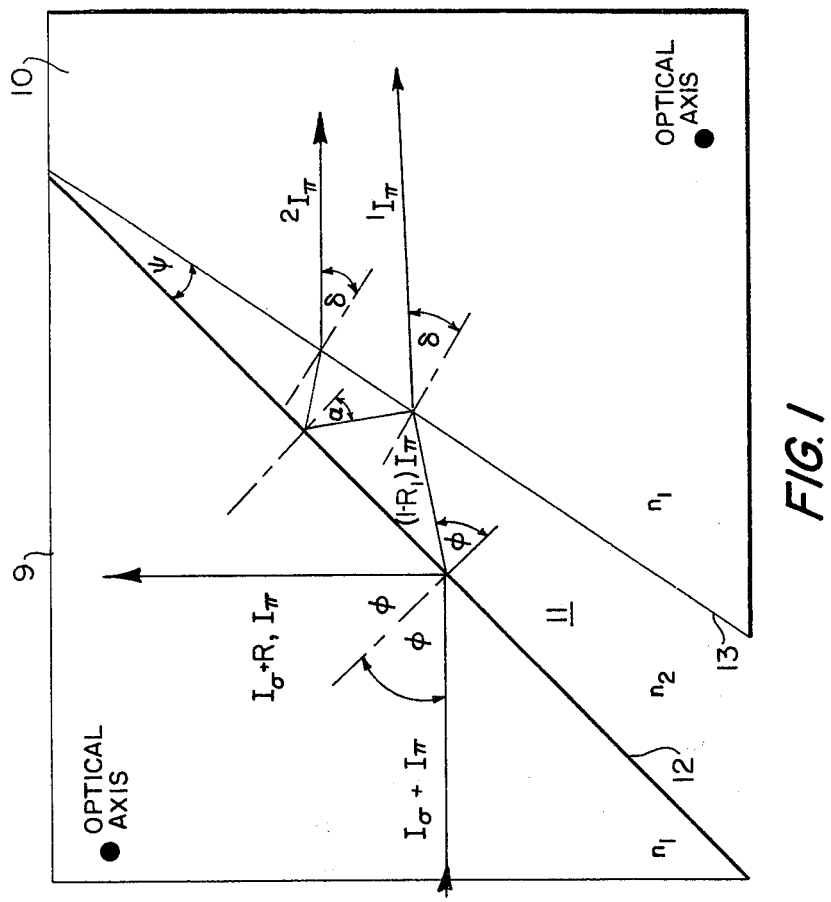
FIG. 1 illustrates the optical path of a laser beam through a Glan-laser prism.
Figure 2:
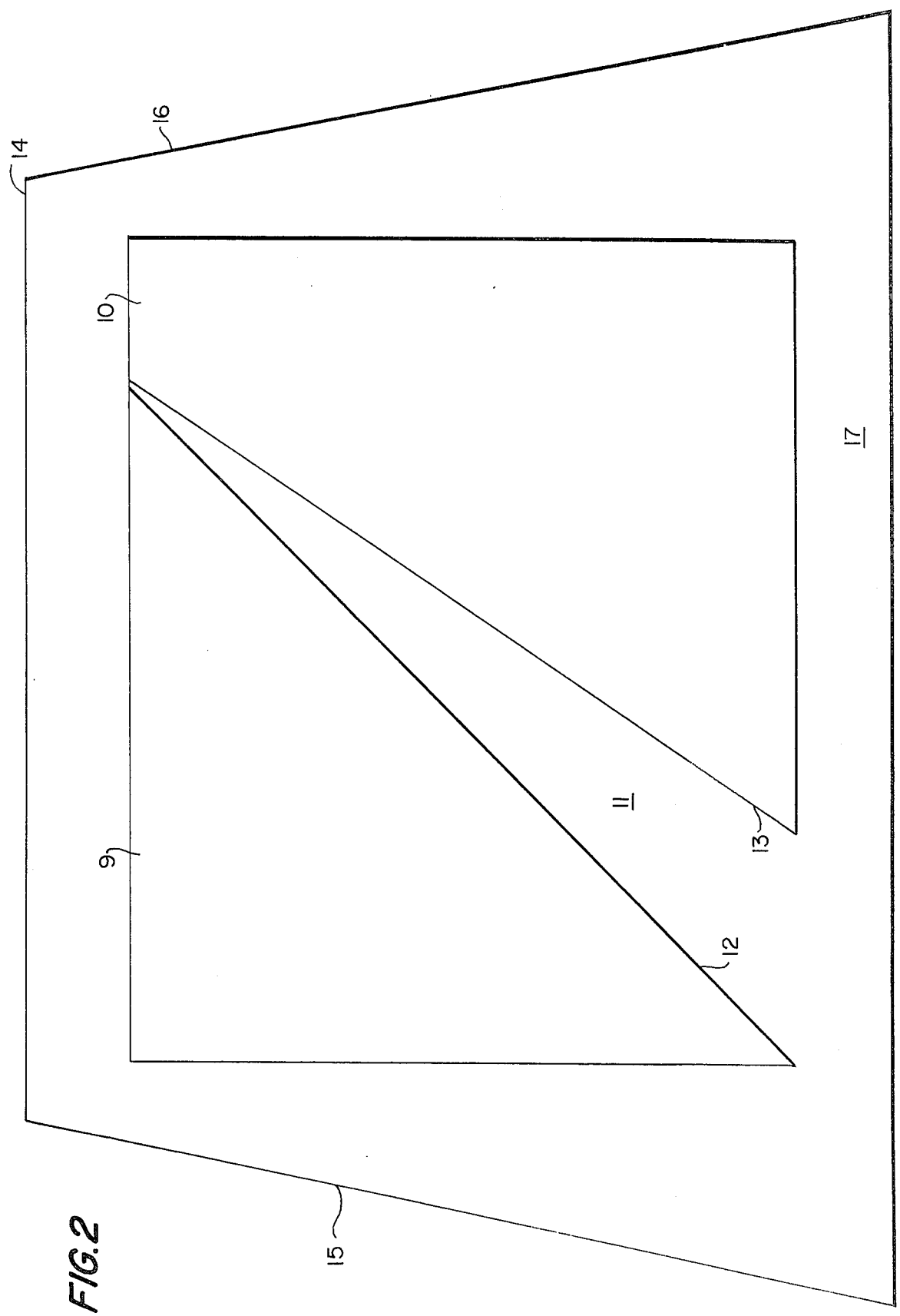
FIG. 2 illustrates the Glan-laser prism within a housing with the ends at Brewster's angle.

Now referring to the drawing, there is shown by illustration a fluid gap Glan-laser prism made in accordance with the teaching of this invention. As shown, the Glan-laser prism polarizer includes a first prism 9, and a second prism 10 with a gap 11 or space in between adjacent faces 12 and 13 of the prisms. The faces 12 and 13 of the prisms are at an angle relative to each other thereby forming a wedge shaped gap between prisms 9 and 10. The prisms are sealed in a chamber 14 with polished Brewster's angle windows 15,16 through which the laser pulse passes on entering and leaving the Glan-laser prism. The sealed chamber and gap between the prisms are flooded with a fluorinated liquid 17, FC-48, manufactured by the 3M Company. FC-48 is a fluorinated liquid which has an index of refraction of 1.312, high boiling point of 174°C, a very high dielectric strength (2KV mm), and does not absorb water. Therefore the FC-48 liquid protects the KD*P from contact with water. Since the optical transmission of FC-48 is greater than 99%/meter at 1.064M, it will not heat up and cause pressure or thermal damage during the passage of a high energy laser pulse. In forming the Glan-laser prism, a uniaxial birefringent crystal of KD*P is cut with its optical axis perpendicular to the intended plane of incidence of the light beam on the existing face. Light traveling through the crystal is described by two polarizations $I_\delta$ with its electric field vector perpendicular to the optic axis and $I\pi$ with its electric field vector parallel to the optic axis. Since the KD*P crystal is birefringent each of the components of the incident beam sees a different index of refraction such as $N = 1.44$ and $N = 1.47$. On leaving the crystal, the light beam travels from a more dense to a less dense medium. By Snell's law the two exit angles $\theta\pi$ ' and $\theta\delta$ ' are given by $$\pi N_1 \sin \theta = N_2 \sin \theta\pi \,'$$

$$\delta N_1 \sin \theta = N_2 \sin \theta\delta \,'$$

where $\theta$ = angle between the incoming beam and the normal to the first polarizing interface; $\delta N_1$, $\pi N_1$ = indexes of refraction of the birefringent crystal; $N_2$ = the index of refraction of the fluid in the spacing between the crystals.

In the prism shown in the drawing, the following calculations are carried out for the fluid filled gap in which the gap has an angle of 1°, where $\theta_{c\delta}$ is the critical angle for the $\delta$ -polarized beam and $\theta_{c\pi}$ is the critical angle for the $\pi$ -polarization beam $$\theta_{c\delta} = \text{Arc sin } (N_2/N)$$

$$\theta_{c\delta} = \text{Arc sin } \left(\frac{1.31}{1.47}\right) = 63.02°$$

$$\theta_{c\pi} = \text{Arc sin } \left(\frac{1.31}{1.44}\right) = 65.47°$$

Let $$\theta = \theta_{c\delta} + 0.5 = 63.52°$$

then $$\theta' = 79.71°$$

$$\delta = 63.14°$$

$$a = 62.73°$$

$\delta' = 62.30°$

Where $\delta$ = angle between the transmitted beam and the normal to the reciprocal polarizing interface, $\delta'$ = angle between the first forward reflected beam and the normal to the reciprocal polarizing surface; a = angle of the first forward reflected beam incident on the first polarizing surface and the normal with the surface.

It has been determined KD*P submerged Glan-laser prisms reduce the reflections at the interface and allows the wedging of the gap between the sections so that the forward reflected beams will diverge from the path of the desired beam. Also the fluid acts to protect the KD*P prism from moisture and from rapid thermal fluctuations.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A Glan-laser prism polarizer which comprises:
   first and second prisms made of a biregringent material positioned with end faces parallel with each other and with sloping faces adjacent each other with their optical axes parallel
   said sloping faces having a different slope and meeting at one edge to form an angular gap between said prisms with the apex of said angular gap at the point at which said faces meet,
   said first and second prisms being immersed in a fluorinated liquid with said liquid filling said angular gap therebetween, and
   said liquid having an index of refraction which is less than that of said prisms.

2. A Glan-laser prism polarizer as claimed in claim 1; wherein,
   the index of refraction of the prisms for light traveling through said crystal with its electric field vector parallel to the optic axis is about 1.44 and is about 1.47 for the light traveling with its electric field vector perpendicular to the optic axis.

3. A Glan-laser prism as claimed in claim 2; wherein, the index of refraction of said fluid is about 1.3.

\* \* \* \* \*